United States Patent [19]

Winker et al.

[11] 4,125,233
[45] Nov. 14, 1978

[54] TETHERED AERODYNAMIC BALLOON WITH INTEGRAL FINS

[75] Inventors: James A. Winker, Sioux Falls; Kenneth L. Tekrony, Brandon, both of S. Dak.

[73] Assignee: Raven Industries, Inc., Sioux Falls, S. Dak.

[21] Appl. No.: 793,486

[22] Filed: May 4, 1977

[51] Int. Cl.$^2$ .............................................. B64B 1/42
[52] U.S. Cl. ......................................... 244/33; 46/87; 244/126
[58] Field of Search ................. 46/87, 88, 89; 244/30, 244/87, 31, 32, 33, 126, 125, 127, 128, 96; 428/12; 156/291, 292

[56] References Cited

U.S. PATENT DOCUMENTS

| | | | |
|---|---|---|---|
| 1,881,048 | 10/1932 | Dorogi et al. | 46/87 |
| 3,107,884 | 10/1963 | Simko | 244/31 |
| 3,108,765 | 10/1963 | Stone | 244/31 |
| 3,127,135 | 3/1964 | Burr et al. | 244/126 |
| 3,151,825 | 10/1964 | Kindling | 244/33 |
| 3,448,864 | 6/1969 | Fenn et al. | 244/33 X |

*Primary Examiner*—Galen L. Barefoot
*Attorney, Agent, or Firm*—Hill, Gross, Simpson, Van Santen, Steadman, Chiara & Simpson

[57] ABSTRACT

A non-rigid aerodynamic balloon having integral stabilizing tail fins is provided. The balloon is most useful in tethered applications, such as for advertising. The balloon is formed from a plurality of flexible skin-like gores which are joined together with a plurality of longitudinal seams running lengthwise of a main body of the balloon. Each gore is a continuous piece of flexible skin-like material which forms a portion of the body and a side wall of one of the stabilizing fins. The longitudinal seams join adjacent gores along outer edges of the stabilizing fins so that seams are not required to join the stabilizing fins to the main body of the balloon.

8 Claims, 4 Drawing Figures

U.S. Patent  Nov. 14, 1978  Sheet 1 of 2  4,125,233
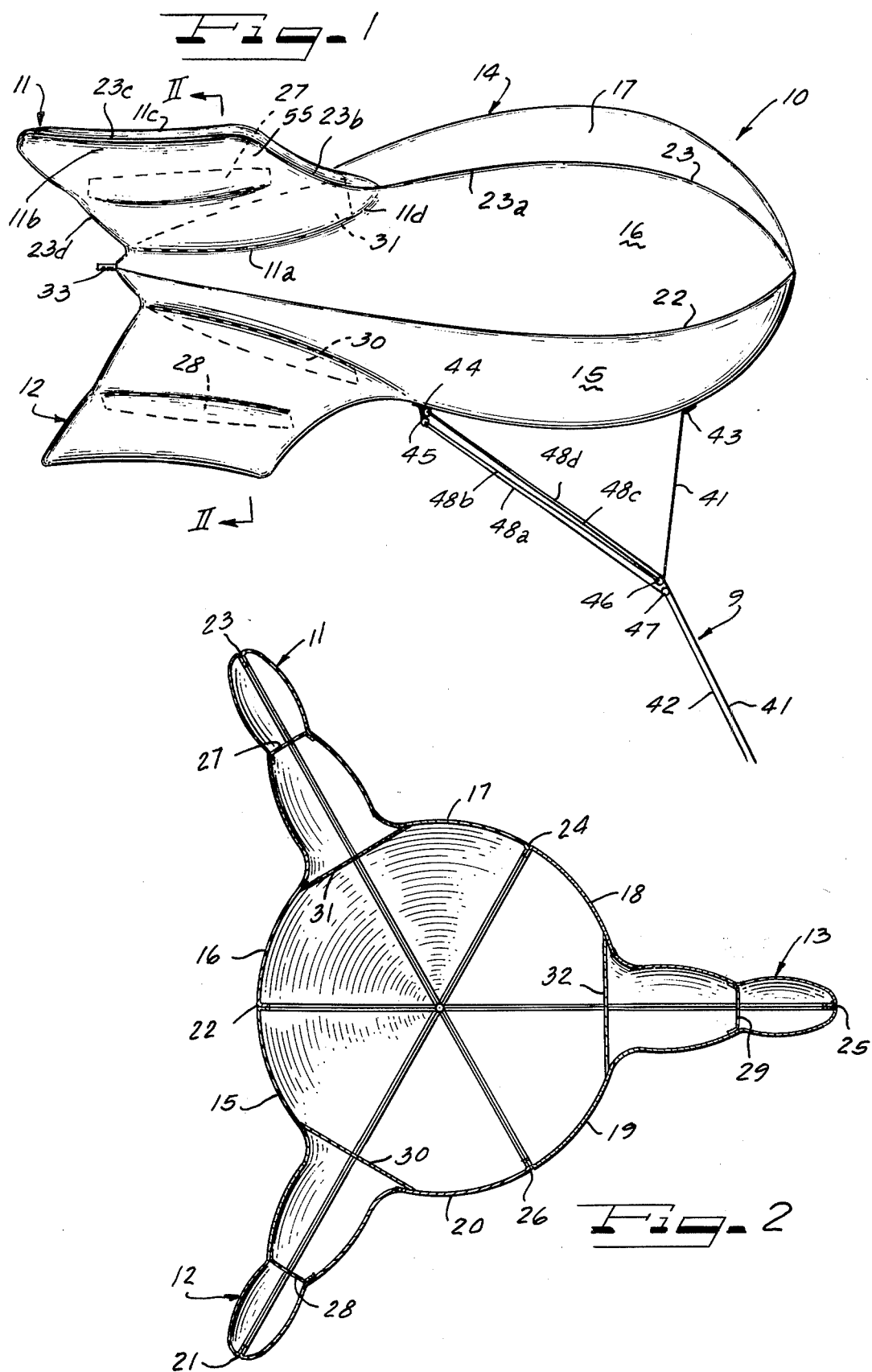

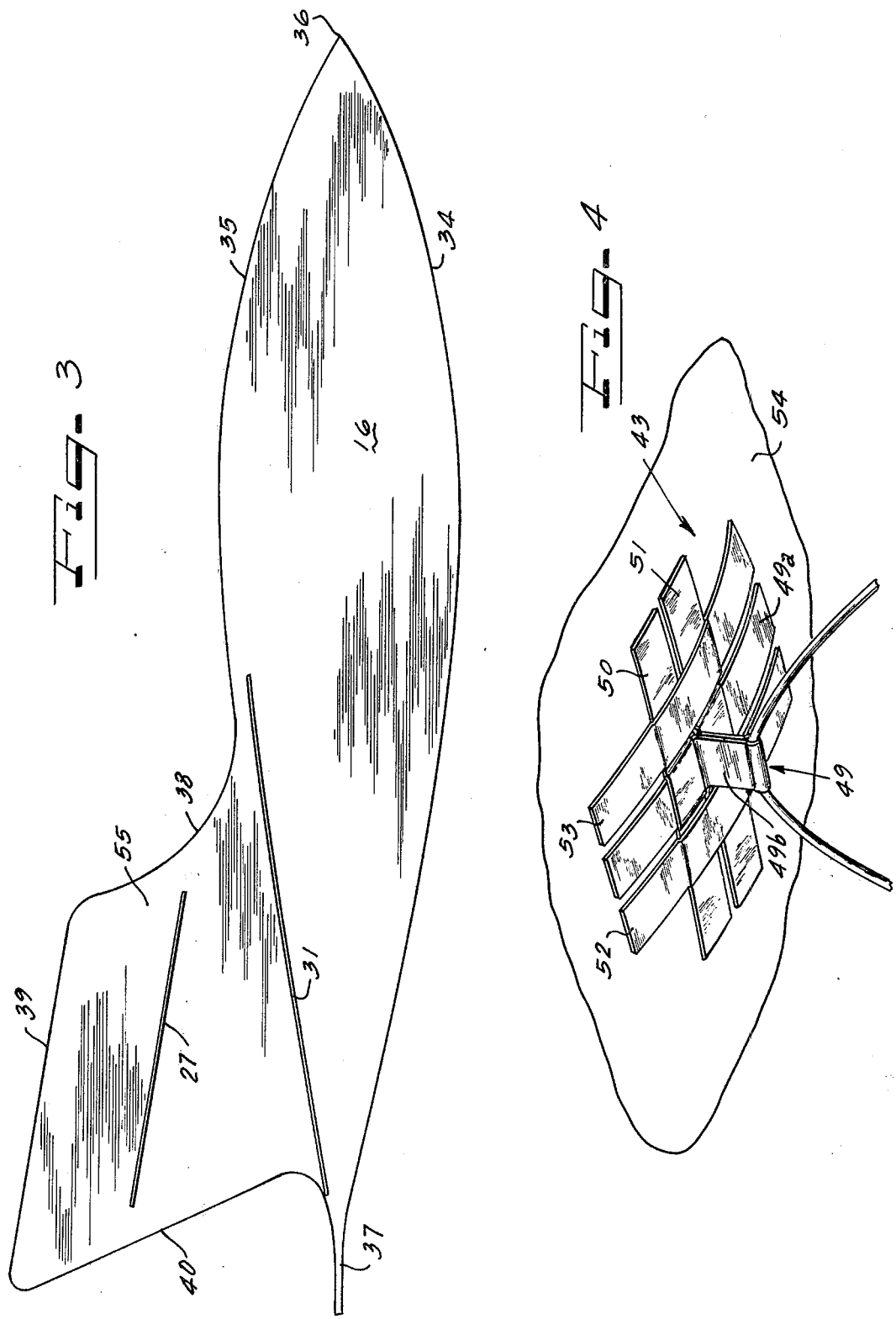

TETHERED AERODYNAMIC BALLOON WITH INTEGRAL FINS

BACKGROUND OF THE INVENTION

1. Field of the Invention

This invention relates to non-rigid aerodynamic balloons and more particularly to non-rigid balloons which are tethered and are used for advertising applications.

2. Description of the Prior Art

Aerodynamic tethered balloons for use in advertising or scientific applications, for example, are generally known. Such balloons usually have tail fins to keep them oriented and stable in the wind. These tail fins are either rigid or inflatable. Rigid fins maintain their shape because of the presence of structural members of metal or wood which support the tail fin membrane which may be flat or of an airfoil shape. Rigid fins are generally considered to have an advantage in some sizes of tethered balloons because they can be designed to be stiffer and to result in less stability problems. Their main disadvantage is that they are usually heavier, causing a payload penalty in medium size balloons, and being altogether too heavy to be practical on small, tethered balloons.

Inflatable fins are often desirable because of their lightness and because they can be readily made in airfoil shapes. A disadvantage of previous inflated tail fins has been the excessive amount of hand labor required to build and attach them, and the resulting large amount of seam area at the interface of the fin and the hull or main body of the balloon. This seam area has been notorious for leakage problems.

SUMMARY OF THE INVENTION

It is an object of the present invention to provide a aerodynamic balloon in which stabilizing fins are an integral portion of the balloon body so that seams are not required to join the tail fins to the main body of the balloon.

It is another object of this invention to eliminate leakage problems at the interface between the fin and the main body of the balloon.

It is another object of this invention to reduce the amount of hand labor required to build aerodynamic balloons.

In the present invention, a non-rigid aerodynamic balloon suitable for tethering has a main body and protruding stabilizing fins. The balloon is formed with a plurality of gores of skin-like flexible material which are joined together along longitudinal seams. Each gore may have outwardly curved longitudinal edges and a fin side wall portion which extends from one of the longitudinal edges. The gores are joined together along longitudinal seams generally formed in the direction of a lengthwise axis of the balloon body and also at outer edges of the stabilizing fins.

The present invention retains the advantage of lightweight construction for the fins, combined with effective streamlining, yet totally eliminates the most leakage prone joint. The fin surface is formed from material which is contiguous with the hull material. When two adjacent hull gores are assembled together, the fin automatically becomes a part of the assembly. Additional structure which may be provided are one or more ribs or baffles (usually flat membranes of fabric) for support of the stabilizing fins. One such supporting member may be positioned within a fin while the other may be adjacent a base of the fin within the internal portion of the balloon structure. This latter supporting membrane does not in fact close off the gas passages to the tail fins since the fins are inflated directly from the main body of the balloon. This supporting membrane at the base of the tail fin provides the continuity of structure which is found in previous designs as a part of the hull material itself.

According to the invention, there are preferably no joints in the fabric at the base of the fin where leakage is traditionally found. The principal seams are then full length longitudinal seams which are much easier to control and less likely to leak.

The type of material used for the skin of the balloon contributes to the success of this invention. Contours change quite rapidly from the streamlined shape of the hull where it transforms into the protruding fins. A high modulous, inflexible skin would wrinkle badly in the transition region. Preferred materials are medium to low modulous plastic films or coated fabrics which have a reasonable amount of elasticity. Typical plastic films which are well suited include vinyl and polyurethane, while lightweight coated nylons have been found suitable among the fabric materials.

This balloon is suitable for any size of tethered aerodynamic balloon but it is particularly adaptable for sizes from about 1–100 cubic meters (35–3500 cubic feet).

BRIEF DESCRIPTION OF THE DRAWINGS

FIG. 1 is a side view of a non-rigid aerodynamic balloon of this invention;

FIG. 2 is a cross-sectional view taken along line II—II of the balloon of FIG. 1;

FIG. 3 is a plan view of one of the gores of material used to form the balloon of FIG. 1; and FIG. 4 is a fragmentary enlarged view of an attachment system for tethering cables to be attached to the balloon.

DESCRIPTION OF THE PREFERRED EMBODIMENTS

The tethered aerodynamic balloon with integral fins of this invention is shown generally at 10 in FIG. 1. A tethering system 9 retains the balloon in position above the ground. Stabilizing tail fins 11, 12 and 13 are preferably spaced equal distances from one another adjacent one end of the balloon main body or hull 14.

Six gores 15 through 20 are attached together at longitudinal seams 21 through 26 to form the balloon structure. A plan view of one of the gores 16 is shown in FIG. 3. One of the longitudinal seams such as 23 is comprised of a body seam portion 23a, and seam portions along outer edges of the tail 11, specifically front tail fin seam portion 23b, top tail fin seam portion 23c and rear tail fin seam portion 23d. An inwardly curved portion 11a is positioned on each side of the tail fin 11 at the base thereof. Upper outwardly bending portions 11b and 11c are positioned along the seam 23c. A curved merging portion 11d occurs at the junction of the seam portion 23b and seam portion 23a.

To prevent adjacent side walls of the tail fin 11, for example, from spreading, an upper fin support member 27 which may be a skin-like membrane or a rib, is attached between adjacent fin side walls and runs longitudinally generally in the direction of the lengthwise axis of the balloon. Similar fin support members 28 and 29 are respectively positioned in fins 12 and 13 as shown most clearly in FIG. 2.

Fin base support members 30, 31 and 32 are respectively provided adjacent the base portions of fins 12, 11 and 13 respectively. These support members again are preferably skin-like membranes or ribs which are attached generally at the transition point between the main body of the balloon and the fin side walls to prevent the base portions of the side walls from spreading apart.

An inflation nozzle 33 is preferably provided at an end of the balloon adjacent the fins and functions as an inlet for a lifting gas such as helium to be placed into the balloon and sealed therein by closing the nozzle 33.

Referring to FIG. 3, a plan view of gore 16 is shown which has a shape generally defined by outwardly curved edges 34 and 35 respectively joined at seams 22 and 23 in the assembled balloon. At one end of the gore 16 a point 36 is formed where the curved edges 34 and 35 meet. Extending from the curved edge 35 at the other end of the gore 16 is the material utilized for a side wall 55 of tail fin 11. This side wall is generally of a trapezoidal shape defined by a curved front edge 38, a substantially straight edge 39 and a substantially straight rear edge 40. A portion of the material used to form the nozzle is shown at 37.

Preferably the material used for the gore is a medium to low modulous plastic film or a coated fabric having a reasonable amount of elasticity. Typical plastic films include vinyl and polyurethane while lightweight coated nylons have been found suitable for fabrics. It is important to note that the gore may be formed from a single contiguous piece of material for both the portion of the gore used for the main body of the balloon and the portion of the gore used for the side wall of the fin.

Referring again to FIG. 1, a tethering system 9 is shown particularly well adapted for use with the balloon of this invention. A main tether line 41 attaches near a leading end of the balloon with a front attachment member 43. An attitude adjusting tether 42 of somewhat less tensile strength than the main tether is secured to a trailing end of the balloon by a rear attachment member 44.

The adjusting tether 42 is preferably arranged in a pulley system formed of a ring 45 adjacent the rear attachment member 44 and rings 46 and 47 attached downwardly from the front attachment member 43 on the main tether 41. By looping the adjusting tether through these rings to create four looped sections 48a, 48b, 48c and 48d, operator adjustment of the attitude of the balloon in flight is simplified since less pull need be exerted on the adjusting tether 42.

FIG. 4 shows a detail of the attachment members 43 or 44. A T-shaped attachment strip 49 having a strip portion 49a and a perpendicular support portion 49b is attached such as by adhesive to the skin 54 of the balloon. Cross strips 50 and 51 are then laid across the strip portions 49a in perpendicular fashion. Parallel strips 52 and 53 are then arranged to cross over the strips 50 and 51.

Although various minor modifications may be suggested by those skilled in the art, it should be understood that we wish to embody within the scope of the patent warranted hereon, all such embodiments as reasonably and properly come within the scope of our contribution to the art.

We claim as our invention:

1. A non-rigid aerodynamic balloon comprising:
    an elongate tubular aerodynamic shaped body with a rounded nose at one end and a tail at the other end;
    a plurality of inflatable stabilizing fins projecting radially from the tail end with body portions of the balloon between said fins;
    said body and tail fins made of a lightweight skin material formed in gores seamed to each other by longitudinal seams running the full length of the body;
    said seams including intermediate seams extending between said tail fins in said body portion and including tail seams extending linearly along the body and continuing along the outermost edge of the tail fins;
    each side of said fins being of one continuous gore of said material extending linearly for the length of the balloon and extending radially for the full fin and extending continuously from said tail seam to said intermediate seam so that the base of the fin joins the body portion in curved merging portions;
    and fin support members of extending across within the fins limiting separation of gores at opposite sides of the fins.

2. A non-rigid aerodynamic balloon constructed in accordance with claim 1:
    and including attachment members on the body for attachment of tether lines so that the balloon can be flown as a captive balloon.

3. A non-rigid aerodynamic balloon constructed in accordance with claim 1:
    wherein said lightweight material is a medium to low modulus plastic film.

4. A non-rigid aerodynamic balloon constructed in accordance with claim 1:
    wherein said lightweight material is a coated fabric.

5. A non-rigid aerodynamic balloon constructed in accordance with claim 2:
    and including a tethering line attached to said attachment members and adapted to changing the horizontal attitude of the body.

6. A non-rigid aerodynamic balloon constructed in accordance with claim 1:
    wherein said fin support members are in the form of a rib attached at the edges of the rib to the material of the fins.

7. A non-rigid aerodynamic balloon constructed in accordance with claim 1:
    wherein said fin support members include a base support member at the base of the fin.

8. A non-rigid aerodynamic balloon constructed in accordance with claim 1:
    wherein said fin support members include a member positioned between the base of the fin and tail seam at the radial outer edge of the fin.

* * * * *